(12) United States Patent
Pearson

(10) Patent No.: US 11,384,560 B2
(45) Date of Patent: Jul. 12, 2022

(54) AWNING ASSEMBLY

(71) Applicant: Moon Fabrications Inc., San Francisco, CA (US)

(72) Inventor: Matthew Pearson, San Francisco, CA (US)

(73) Assignee: Moon Fabrications, Inc., San Francisco, CA (US)

( * ) Notice: Subject to any disclaimer, the term of this patent is extended or adjusted under 35 U.S.C. 154(b) by 0 days.

(21) Appl. No.: 16/417,468

(22) Filed: May 20, 2019

(65) Prior Publication Data

US 2019/0352925 A1  Nov. 21, 2019

Related U.S. Application Data

(60) Provisional application No. 62/673,835, filed on May 18, 2018.

(51) Int. Cl.
| | | |
|---|---|---|
| *E04H 15/64* | (2006.01) | |
| *E04F 10/04* | (2006.01) | |
| *B60P 3/34* | (2006.01) | |
| *E04H 15/58* | (2006.01) | |
| *E04H 15/60* | (2006.01) | |

(52) U.S. Cl.
CPC ............ *E04H 15/642* (2013.01); *B60P 3/343* (2013.01); *E04F 10/04* (2013.01); *E04H 15/58* (2013.01); *E04H 15/60* (2013.01)

(58) Field of Classification Search
CPC . B60P 3/343; E04F 10/04; E04F 15/08; E04F 15/322; E04F 15/54; E04F 15/58; E04F 15/60; E04F 15/64; E04F 15/642; E04F 15/06
See application file for complete search history.

(56) References Cited

U.S. PATENT DOCUMENTS

| | | | | |
|---|---|---|---|---|
| 1,394,579 A | * | 10/1921 | Purcell | ................ E04H 15/06 135/88.14 |
| 2,315,680 A | * | 4/1943 | Pratt | .................. E04H 15/06 135/88.05 |
| 2,720,885 A | * | 10/1955 | Legg | .................. B60P 3/343 135/87 |

(Continued)

FOREIGN PATENT DOCUMENTS

| | | | | |
|---|---|---|---|---|
| CA | 1166926 A | * | 5/1984 | ........... E04H 15/425 |
| EP | 3272972 A1 | * | 1/2018 | ............ F16B 5/0692 |

*Primary Examiner* — James M Ference
(74) *Attorney, Agent, or Firm* — Loyal IP Law, PLLC; Travis Banta

(57) ABSTRACT

Disclosed herein are methods, systems, and devices for an awning. An awning apparatus of the disclosure includes a plurality of vertical support members and one or more flexible connectors coupled to the plurality of vertical support members. The one or more flexible connectors are removably secured to an upper end of at least one of the plurality of vertical support members. The apparatus includes a cover adapted for engaging the plurality of vertical support members. The apparatus includes a clipping mechanism attached to the cover and configured to removably secure the cover to at least one of the one or more flexible connectors. The apparatus is such that the one or more flexible connectors is configured to provide tension to hold the cover in a stretched orientation.

15 Claims, 14 Drawing Sheets

(56) References Cited

U.S. PATENT DOCUMENTS

| | | | | |
|---|---|---|---|---|
| 2,788,791 A | * | 4/1957 | Pospisil | E04H 15/06 135/88.07 |
| 2,793,646 A | * | 5/1957 | Lefebvre | E04H 15/06 135/88.14 |
| 2,806,478 A | * | 9/1957 | De Sherbinin | E04H 15/06 135/88.14 |
| 2,815,762 A | * | 12/1957 | Smith | B60P 3/38 135/88.14 |
| 2,828,035 A | * | 3/1958 | Kuchinskie | E04H 15/06 414/462 |
| 2,847,018 A | * | 8/1958 | Weninger | E04H 15/06 135/88.15 |
| 2,853,129 A | * | 9/1958 | Leavitt | B60J 11/08 160/66 |
| 2,859,756 A | * | 11/1958 | Barnes | E04H 15/06 135/88.07 |
| 2,967,532 A | * | 1/1961 | Burgin | E04H 15/06 135/151 |
| 2,989,967 A | * | 6/1961 | Lee | E04H 15/06 135/88.13 |
| 3,018,783 A | * | 1/1962 | Tyson | B60P 3/38 135/88.07 |
| 3,050,074 A | * | 8/1962 | Miller | E04H 15/06 135/88.14 |
| 3,228,405 A | * | 1/1966 | Bursey | E04H 15/06 135/88.15 |
| 3,327,724 A | * | 6/1967 | Nielsen | E04H 15/08 135/121 |
| 3,349,784 A | * | 10/1967 | Roberts | E04H 15/06 135/161 |
| 3,394,719 A | * | 7/1968 | Hansson | E04H 15/06 135/88.14 |
| 3,870,061 A | * | 3/1975 | Lowery | E04H 15/06 135/88.07 |
| 3,906,969 A | * | 9/1975 | Myers | E04F 10/0681 135/88.11 |
| 3,943,953 A | * | 3/1976 | Cantwell | E04H 15/42 135/156 |
| 3,952,758 A | * | 4/1976 | Addison | B60P 3/343 135/88.07 |
| 3,968,809 A | * | 7/1976 | Beavers | B60P 3/343 135/88.14 |
| 4,099,533 A | * | 7/1978 | Gillis | E04H 15/42 135/119 |
| 4,191,418 A | * | 3/1980 | Ladegast, Jr. | B60P 3/343 135/117 |
| 4,265,259 A | * | 5/1981 | Gillis | E04H 15/425 135/115 |
| 4,491,141 A | * | 1/1985 | Eppenbach | E04H 15/425 135/125 |
| 4,519,409 A | * | 5/1985 | Kinney | E04H 15/06 135/88.08 |
| 4,655,236 A | * | 4/1987 | Dorame | E04H 6/025 135/88.06 |
| 4,657,299 A | * | 4/1987 | Mahan | B62D 33/0207 135/88.13 |
| 4,754,774 A | * | 7/1988 | Leader | E04H 15/06 135/120.2 |
| 4,811,751 A | * | 3/1989 | Maloney, II | E04H 15/40 135/125 |
| 4,827,958 A | * | 5/1989 | Cantwell | E04H 15/425 135/119 |
| 4,858,635 A | * | 8/1989 | Eppenbach | E04H 15/36 135/125 |
| 5,067,505 A | * | 11/1991 | Cantwell | E04H 15/40 135/115 |
| 5,197,504 A | * | 3/1993 | Howe | E04H 15/425 135/119 |
| 5,333,634 A | * | 8/1994 | Taylor | E04H 15/28 135/118 |
| 5,368,056 A | * | 11/1994 | Riggi, Jr. | B60P 3/343 135/88.07 |
| 5,381,814 A | * | 1/1995 | Brandon | B60P 3/343 135/88.07 |
| 5,400,813 A | * | 3/1995 | Swan, Jr. | E04H 15/08 135/119 |
| 5,437,298 A | * | 8/1995 | Lin | E04H 15/58 108/129 |
| 5,511,572 A | * | 4/1996 | Carter | E04H 15/50 135/145 |
| 5,558,145 A | * | 9/1996 | Baka | B60P 3/343 135/88.12 |
| 5,615,725 A | * | 4/1997 | Ming-Shun | B60J 11/02 160/294 |
| 5,651,633 A | * | 7/1997 | Howe | E04H 15/64 135/135 |
| 5,660,425 A | * | 8/1997 | Weber | E04H 15/06 135/88.01 |
| 5,676,414 A | * | 10/1997 | Hammond | B60J 1/2011 296/165 |
| 5,738,130 A | * | 4/1998 | Thomas | E04H 15/06 135/88.13 |
| 5,927,311 A | * | 7/1999 | Jager | E04H 15/48 135/124 |
| 6,050,280 A | * | 4/2000 | Jeske | E04H 15/08 135/115 |
| 6,059,010 A | * | 5/2000 | Yang | B60J 11/02 160/24 |
| 6,357,461 B1 | * | 3/2002 | Chai | B60J 1/2011 135/117 |
| 6,425,623 B2 | * | 7/2002 | Nakayama | B60J 3/002 296/95.1 |
| 6,499,497 B1 | * | 12/2002 | Swetish | E04H 15/16 135/115 |
| 6,523,558 B1 | * | 2/2003 | Gillis | E04H 15/60 135/119 |
| 6,591,849 B1 | * | 7/2003 | Swetish | E04H 15/46 135/123 |
| D492,640 S | * | 7/2004 | Greene | D12/401 |
| 6,796,359 B1 | * | 9/2004 | Knutson | E04F 10/04 135/88.12 |
| 6,908,138 B2 | * | 6/2005 | Yang | B60J 11/025 135/88.1 |
| 6,997,497 B2 | * | 2/2006 | Sagi | B60R 9/055 224/309 |
| 7,040,333 B1 | * | 5/2006 | Ransom | E04H 15/32 135/115 |
| 7,090,282 B2 | * | 8/2006 | Li | B60J 11/02 150/166 |
| 7,108,005 B1 | * | 9/2006 | Christenson | E04H 15/06 135/88.05 |
| 7,240,684 B2 | * | 7/2007 | Yang | B60J 7/11 135/88.07 |
| 7,354,096 B2 | * | 4/2008 | Hacker | B60J 11/00 296/136.12 |
| 7,789,097 B1 | * | 9/2010 | Sotirkys | E04H 15/06 135/88.01 |
| 7,954,504 B2 | * | 6/2011 | Price | E04H 15/425 135/156 |
| 8,607,810 B1 | * | 12/2013 | Chung | E04H 6/04 135/88.06 |
| 8,708,027 B2 | * | 4/2014 | Howie | E04H 15/06 160/368.1 |
| 8,763,621 B2 | * | 7/2014 | Jin | E04H 15/44 135/115 |
| 9,010,348 B1 | * | 4/2015 | Kite | E04H 15/08 135/88.06 |
| 9,333,894 B1 | | 5/2016 | Hunting, Sr. | B60J 11/06 |
| 9,506,268 B1 | * | 11/2016 | Bright | E04H 15/02 |
| 9,926,715 B1 | | 3/2018 | Morrison | E04H 6/04 |
| 2003/0056817 A1 | | 3/2003 | Miller | H04N 5/65 135/117 |
| 2004/0000800 A1 | * | 1/2004 | Dalpizzol | B60J 5/101 296/163 |
| 2005/0087220 A1 | * | 4/2005 | Christensen | E04H 15/06 135/88.16 |
| 2005/0211286 A1 | * | 9/2005 | Chen | B60J 11/02 135/88.07 |

(56) References Cited

U.S. PATENT DOCUMENTS

| | | | | |
|---|---|---|---|---|
| 2006/0064818 A1* | 3/2006 | Danaher | E04H 15/40 | 5/414 |
| 2007/0084491 A1* | 4/2007 | Dalbo | E04H 15/50 | 135/88.07 |
| 2007/0227571 A1* | 10/2007 | Youn | E04H 15/44 | 135/135 |
| 2008/0053504 A1* | 3/2008 | Al-Mutairi | E04H 6/025 | 135/88.06 |
| 2008/0230104 A1* | 9/2008 | Potter | E04H 15/06 | 135/88.14 |
| 2009/0038766 A1* | 2/2009 | Smith, Jr. | B60J 11/06 | 160/370.21 |
| 2009/0090406 A1* | 4/2009 | Maximilien | E04H 15/06 | 135/88.13 |
| 2009/0179455 A1* | 7/2009 | Ogden | E04H 15/06 | 296/161 |
| 2011/0132420 A1* | 6/2011 | Livacich | E04H 15/001 | 135/123 |
| 2011/0315178 A1* | 12/2011 | Rothermich | E04H 15/001 | 135/88.01 |
| 2012/0017955 A1* | 1/2012 | Zemitis | E04H 15/44 | 135/96 |
| 2012/0091017 A1* | 4/2012 | Merritt | E04H 9/028 | 206/223 |
| 2012/0180835 A1* | 7/2012 | Frost | A45B 25/18 | 135/44 |
| 2012/0279540 A1* | 11/2012 | Jin | E04H 15/16 | 135/94 |
| 2012/0306232 A1* | 12/2012 | Shumaker | E04H 15/06 | 296/136.07 |
| 2013/0152988 A1* | 6/2013 | Ponciano | E04H 15/001 | 135/143 |
| 2014/0041703 A1* | 2/2014 | Funston | E04H 15/58 | 135/121 |
| 2015/0167344 A1* | 6/2015 | Li | E04H 15/48 | 135/143 |
| 2015/0376912 A1* | 12/2015 | Livacich | E04H 15/44 | 135/127 |
| 2016/0267824 A1* | 9/2016 | Lacross | G09F 15/0018 | |
| 2016/0289996 A1* | 10/2016 | Kendrick | E04H 15/34 | |
| 2017/0167158 A1* | 6/2017 | Lynch | E04H 15/56 | |
| 2017/0241158 A1* | 8/2017 | Dresch | E04H 15/14 | |
| 2017/0247908 A1* | 8/2017 | Shirley-Smith | E04H 15/322 | |
| 2017/0307004 A1* | 10/2017 | Cardella | E05B 15/102 | |
| 2018/0010361 A1* | 1/2018 | Carradinha | E04H 15/42 | |
| 2018/0022285 A1* | 1/2018 | Karuppaswamy | B60P 3/36 | 224/486 |
| 2018/0371786 A1* | 12/2018 | Pan | E04H 15/54 | |
| 2019/0352925 A1* | 11/2019 | Pearson | E04H 15/60 | |

* cited by examiner

AWNING ASSEMBLY

CROSS-REFERENCE TO RELATED APPLICATIONS

This application claims the benefit of U.S. Provisional Application No. 62/673,835, filed May 18, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to systems and devices for an awning and particularly relates to systems and devices for a removable awning configured to be attached to a vehicle.

BACKGROUND

Outdoor activities utilizing a motor vehicle are enjoyed by people across the world. Such activities may include, for example, camping, sports activities, swimming, group gatherings, and so forth. Particularly in certain weather conditions, such activities can necessitate the use of a shield to protect individuals from sun or inclement weather. Awning assemblies may be used in connection with trailers or recreational vehicles and may alternatively be freestanding. Individuals enjoying outdoor activities without a trailer or recreational vehicle who wish to have protection or shade that is near a vehicle may benefit from an awning that is configured to be attached to other types of motor vehicles.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
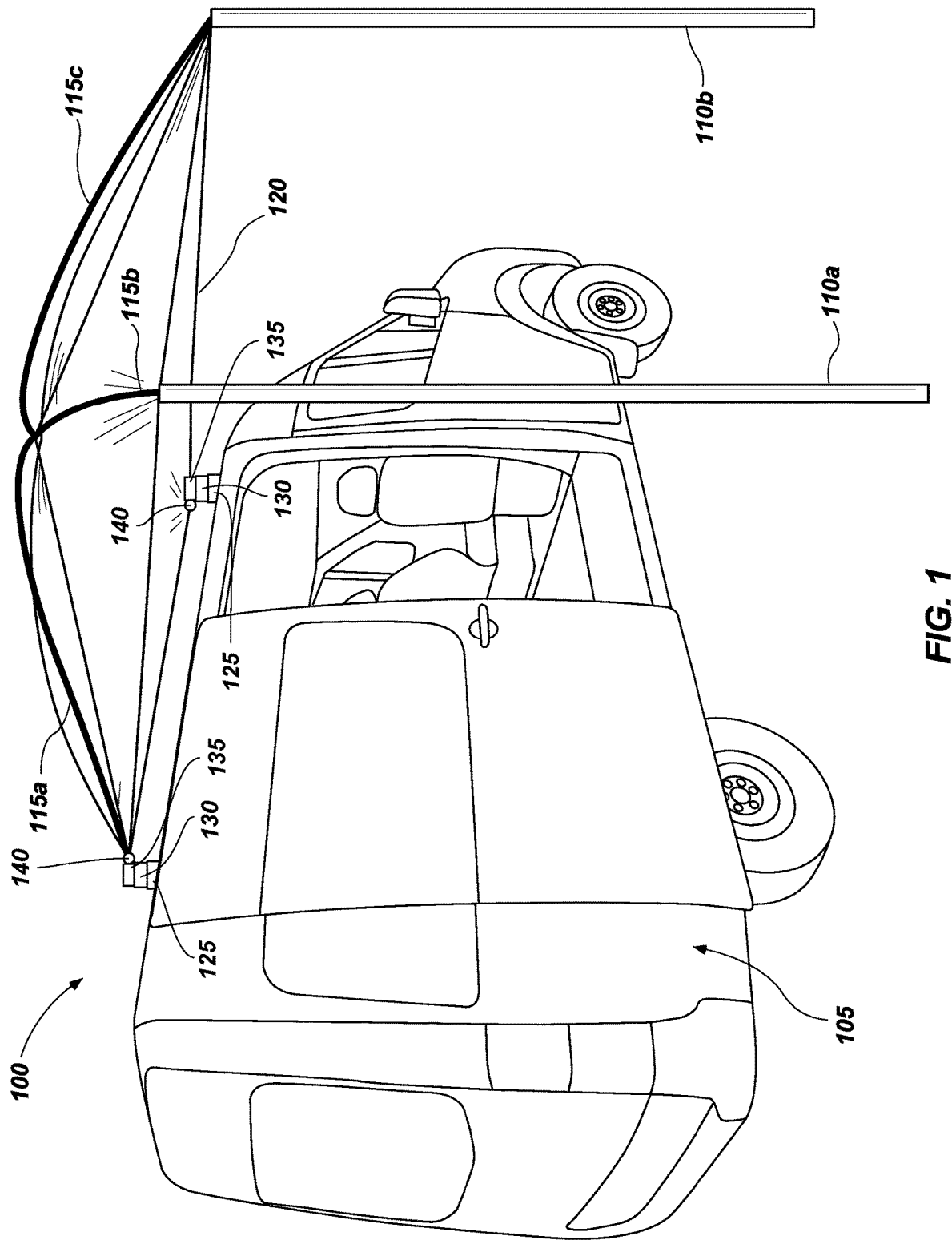
FIG. 1 illustrates a perspective view of an awning apparatus in accordance with the technologies and features of the disclosure.

The present disclosure extends to apparatuses, methods, and systems for an awning for providing comfort or protection against weather elements. More specifically, the disclosure extends to a removable awning configured to be attached to a vehicle such as a van. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

Before the structures, systems, and methods for an awning are disclosed and described, it is to be understood that this disclosure is not limited to the structures, configurations, process steps, and materials disclosed herein as such structures, configurations, process steps, and materials may vary somewhat. It is also to be understood that the terminology employed herein is used for describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

In an embodiment of the disclosure, an awning apparatus is provided. The apparatus includes a plurality of vertical support members and one or more flexible connectors coupled to the plurality of vertical support members, wherein each of the one or more flexible connectors is removably secured to an upper end of at least one of the plurality of vertical support members. The apparatus includes a cover adapted for engaging the plurality of support members. The apparatus includes an attachment mechanism attached to the cover and configured to removably secure the cover to at least one of the one or more flexible connectors. The apparatus is such that the one or more flexible connectors is configured to provide tension to hold the cover in a stretched orientation.

In an embodiment of the disclosure, an awning apparatus configured to be attached to an exterior side of a motor vehicle is provided. In an embodiment, the apparatus includes at least two vertical support members connected to a cover. The apparatus includes a flexible connector, wherein the flexible connector comprises a first end attached to the exterior of the motor vehicle and a second attached to one of the at least two vertical support members. The cover is configured to be outstretched in an orientation approximately normal to the at least two vertical support members. The cover is configured to be outstretched underneath the flexible connector. The flexible connector is configured to provide tension to hold the cover in a stretched orientation.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether those elements are shown or described in another embodiment or figure. In other words, elements in the figures may be interchangeable between various embodiments disclosed herein, whether shown or not.

Referring now to the figures, FIG. 1 illustrates a perspective view of an awning 100 in accordance with an embodiment of the disclosure. In an embodiment as illustrated in FIG. 1, the awning 100 is configured to be secured to an exterior side of a motor vehicle 105 such as a van or other suitable motor vehicle 105. The awning 100 includes a plurality of vertical support members 110a, 110b (may be referred to as 110 when referencing one or more of the plurality) and a cover 120. The awning 100 includes one or more flexible connectors 115a, 115b, 115c. The cover 120 is configured to be connected to the vertical support members 110a, 110b and the flexible connectors 115a, 115b, 115c. As illustrated in FIG. 1, the awning 100 provides protection from the sun or other inclement weather situations. The awning 100 further provides convenient access to the motor vehicle 105 while the awning 100 is in use.

In an embodiment, the motor vehicle 105 is a van as illustrated in FIG. 1. The motor vehicle 105 need not include any specialized connection components and the awning 100 may be constructed to be universal to any suitable motor vehicle 105. In an embodiment, the motor vehicle 105 includes a support bar or rack and the awning 100 is configured to connect to the support bar or rack. In another embodiment, motor vehicle 105 may have included one or more suction mounts 130 which attach, by suction to a roof or side of motor vehicle 105. The suction mount 130 may include a suction cup 125. Suction mount 130 may connect to flexible connectors 115a, 115b, 115c by a female connector receiver 135 which may accept a male portion of flexible connectors 115a, 115b, 115c. It is further noted that awning 100 may be connected to any surface by a suction cup 125. For example, awning 100 may be connected to a window, a wall, or any other surface capable of maintaining a suction connection between the surface and the suction cup 125.

The vertical support members 110a, 110b are configured to stand in a vertical orientation relative to the ground when the awning 100 is in use. The vertical support members 110a, 110b may be removed and stored when the awning 100 is not in use. In an embodiment, the vertical support members 110a, 110b include a telescoping pole having a plurality of possible lengths (either by adding discrete sections of pole or by having circumferentially smaller pole sections disposed one inside another and extending from inside a section of the pole having the greatest diameter, as a telescope). The vertical support members 110a, 110b may be constructed of any suitable rigid material, including metal, carbon fiber, a polycarbonate, and so forth. In various embodiments the vertical support members 110a, 110b may be configured to be depressed into the ground as stakes, attached to the ground by stakes, or may be configured to weighted down on to a flat surface such as concrete or asphalt, may be configured to be tied down by another mechanism, and so forth. The vertical support members 110a, 110b may be very lightweight to decrease the overall weight of the awning 100 or they may alternatively by weighted to increase stability of the vertical support members 110a, 110b in certain environments.

The vertical support members 110a, 110b may include an attachment component at an upper end configured to secure the vertical support member 110a, 110b to the cover 120 and/or at least one of the one or more flexible connectors 115a, 115b, 115c.

The flexible connectors 115a, 115b, 115c (may be referred to as 115 as a group) are configured to support the cover 120 in a stretched orientation such that the cover 120 provides protection from the sun or inclement weather to a user underneath the cover 120. In an embodiment, the awning 100 includes two flexible connectors 115 and each flexible connector 115 is configured to extend a diagonal length of a rectangular cover 120 when in a flexed orientation. In an embodiment, the awning 100 includes four flexible connectors 115 and each flexible connector 115 is configured to extend one-half of a diagonal length of the rectangular cover 120 when in a flexed orientation.

In an embodiment as illustrated, the flexible connectors 115 may be configured to meet at an approximate center point of the cover 120 and may be configured to support the cover 120 from above. In an embodiment, the flexible connectors 115 are attached to the cover 120 by an attachment mechanism 140 at an approximate center point of the cover 120. The attachment mechanism 140 may include any suitable attachment mechanism 140, including a clip, a snap, a buckle, a hook, a loop, a knot, and so forth. In an embodiment the attachment mechanism 140 is attached to the cover 120 and is configured to removably secure the cover to at least one of the flexible connectors 115.

In an embodiment, the flexible connectors 115 comprise a length and the cover 120 comprises a rectangular shape having a diagonal length. In an embodiment where a flexible connector 115 extends the diagonal length of the cover 120 when in the stretched orientation as shown in FIG. 1, the length of the flexible connector 115 is greater than the diagonal length of the cover 120 when the flexible connector 115 is in a relaxed orientation and the length is approximately equal to the diagonal length when the flexible connector 115 is in use and is in a flexed orientation. In an embodiment where a flexible connector 115 extends one-half the diagonal length of the cover 120 when in the stretched orientation as shown in FIG. 1, the length of the flexible connector 115 is greater than one-half the diagonal length of the cover 120 when in a relaxed orientation and is approximately equal to the one-half the diagonal length when in a stretched orientation.

In an embodiment the flexible connectors 115 include a single pole constructed of a flexible material that may provide a flexed shape as illustrated in FIG. 1. Alternatively, the flexible connectors 115 may be constructed of a rigid material and may not provide a flexed shape as shown in FIG. 1. In an embodiment, the flexible connectors 115 comprise a plurality of shorter hollow poles, wherein the plurality of shorter hollow poles are configured to receive one another end-to-end to form the full length of the flexible connector 115. In an embodiment, the plurality of shorter hollow poles is connected by a flexible cord that is configured to provide the flexible shape and capabilities of the flexible connector 115. In an embodiment, each of the plurality of shorter hollow poles is rigid and the flexibility of the flexible connector 115 is provided at various points where the plurality of hollow poles receives each other end-to-end.

The cover 120 is configured to be outstretched with tension when the awning 100 is in use as illustrated in FIG. 1. The cover 120 may alternatively be referred to as a tarp or shield. The cover 120 may be constructed of a fabric such as a nylon fabric or other suitable fabric. In an embodiment, the cover 120 is flexible and/or comprises a stretchy quality and the cover 120 is configured to be stretched by the flexible connectors 115 and the vertical support members 110. The cover 120 may be constructed of a waterproof material such that the awning 100 provides protection from rain or other precipitation when in use.

Figure 2:
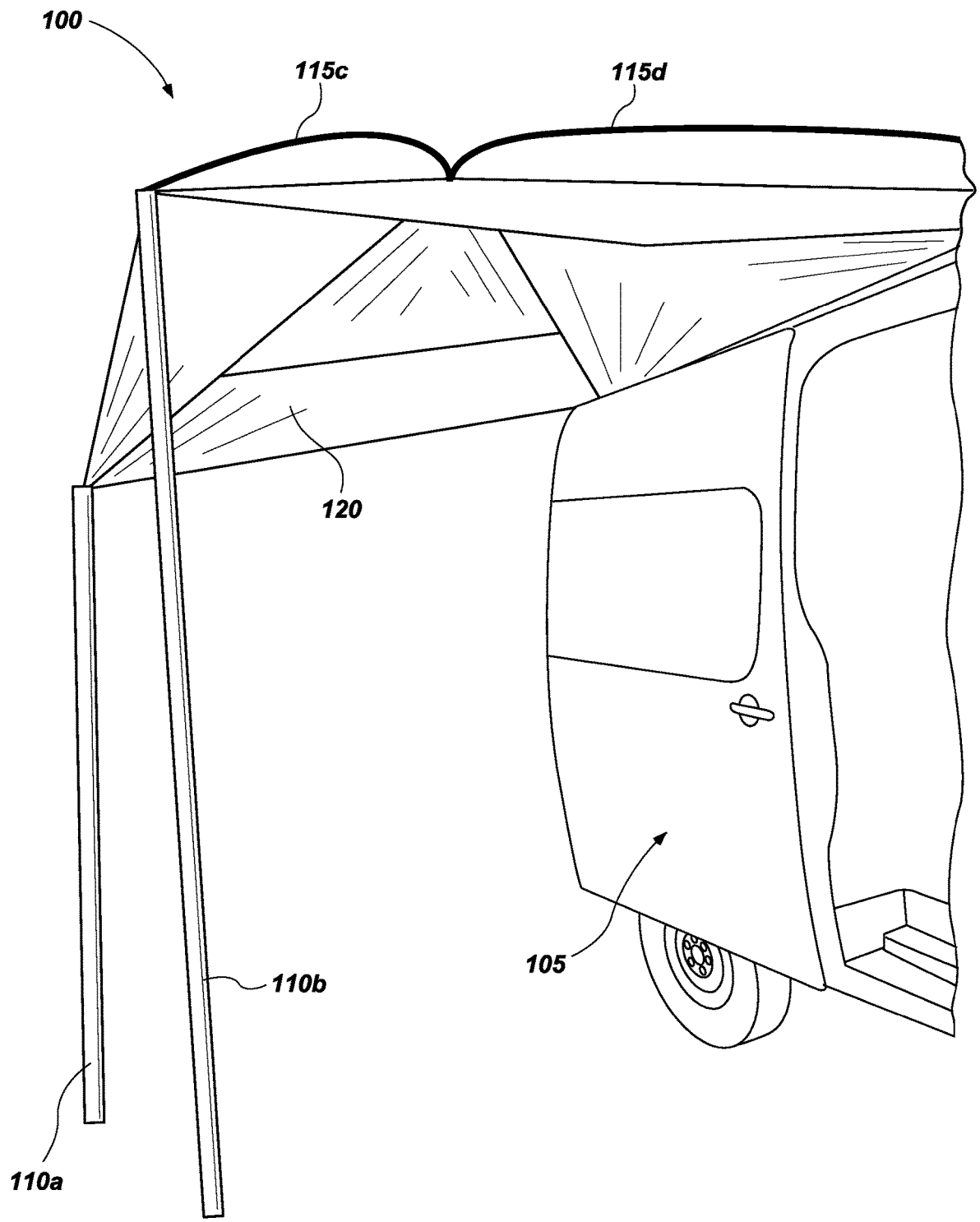
FIG. 2 illustrates a perspective view of an awning apparatus in accordance with the technologies and features of the disclosure.

FIG. 2 illustrates a perspective view of an awning 100. The awning 100 includes a plurality of vertical support members 110a, 110b, one or more flexible connectors 115c, 115d, and a cover 120. In an embodiment as illustrated in FIG. 2, the awning 100 is configured to be attached to a motor vehicle 105 such as a van. The vertical support members 110 may include telescoping poles that may be adjusted to accommodate different heights of varying motor vehicles 105 and may further accommodate variations in terrain. The flexible connectors 115 are configured to maintain the cover 120 in a stretched orientation as illustrated in FIG. 2 such that the cover 120 provides protection from sun and other weather elements to a user.

Figure 3:
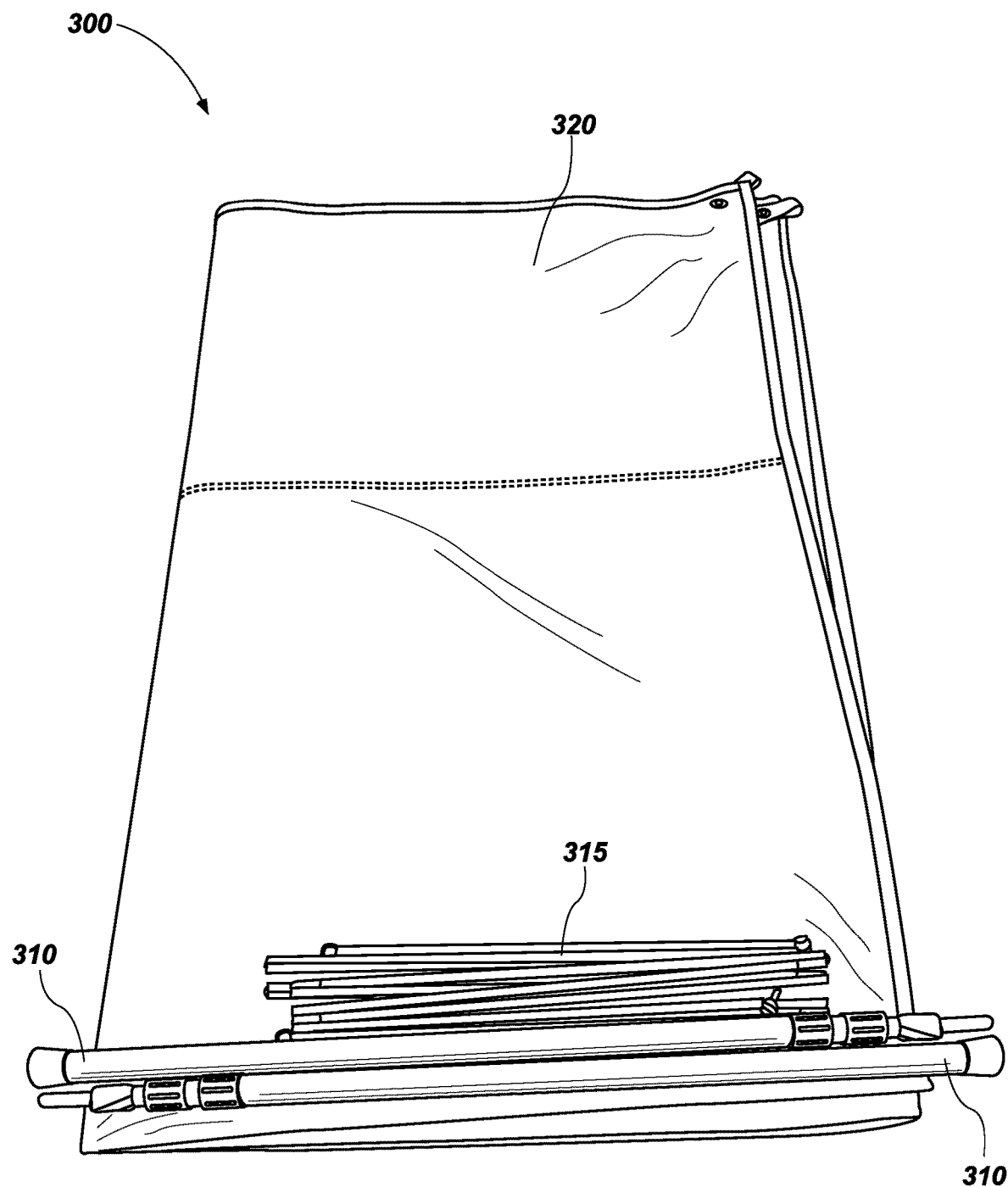
FIG. 3 illustrates an aerial view of an awning apparatus in a storage orientation in accordance with the technologies and features of the disclosure.

FIG. 3 illustrates an awning 300 in a storage orientation. The awning 300 includes a cover 320, at least one flexible connector 315, and one or more vertical support members 310. As illustrated in FIG. 3, the flexible connector 315 may include a plurality of shorter portions that are configured to receive one another end-to-end to form a single flexible connector 315. The plurality of shorter portions may be constructed of a rigid material and the flexibility of the flexible connector 315 may be provided by the connection of the plurality of shorter portions. In an embodiment as illustrated in FIG. 3, the flexible connector 315 may be broken down to provide a small collection of shorter portions such that the flexible connector 315 is easier to store when the awning 300 is not in use. The cover 320 may be folded when the awning 300 is not in use as illustrated in FIG. 3. The vertical support members 310 may be telescoping as illustrated in FIG. 3 such that the vertical support members 310 may be condensed to a shorter length that is more convenient and easier to transport when the awning 300 is not in use.

Figure 4:
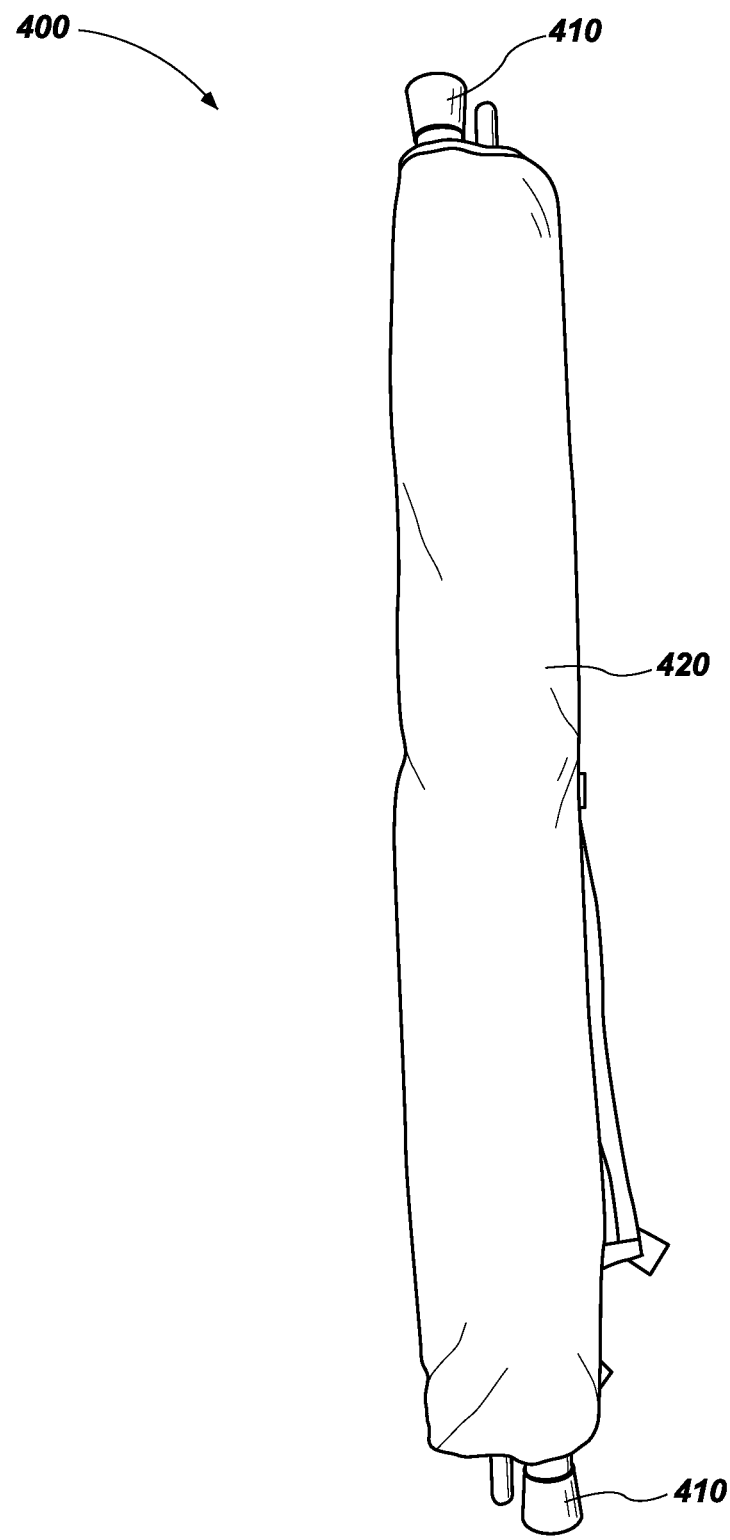
FIG. 4 illustrates an aerial view of an awning apparatus in a storage orientation in accordance with the technologies and features of the disclosure.

FIG. 4 illustrates an awning 400 in a storage orientation. The awning 400 includes a cover 420 and at least one vertical support member 410. As illustrated in FIG. 4, the cover 420 may be folded and may further be utilized to hold the other components of the awning 400 including the vertical support members 410. Further as illustrated in FIG. 4, the vertical support members 410 may be telescoping such that the vertical support members 410 may be shortened when the awning 400 is not in use.

Figure 5:
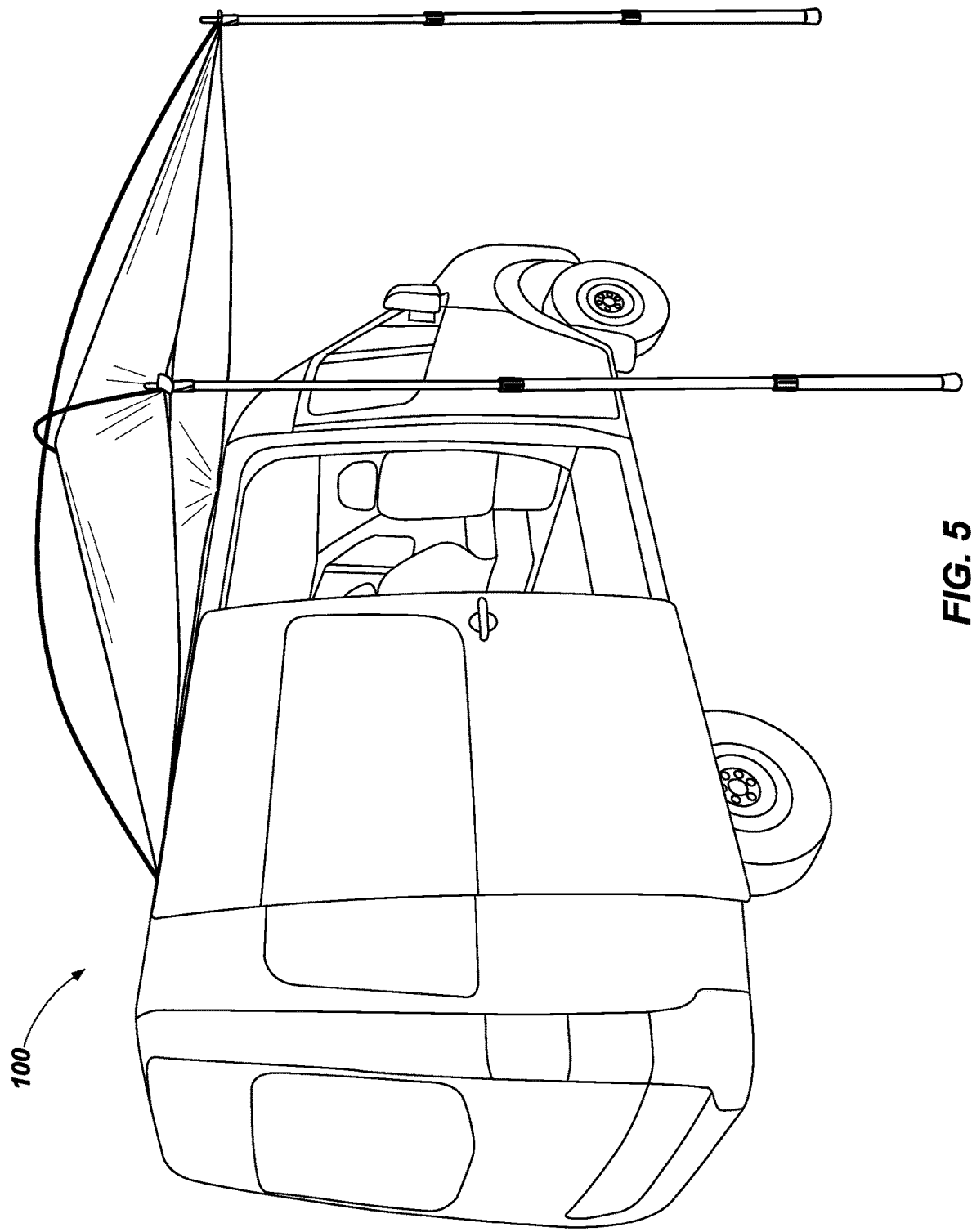
FIG. 5 illustrates a perspective view of an awning apparatus in accordance with the technologies and features of the disclosure.
Figure 6:
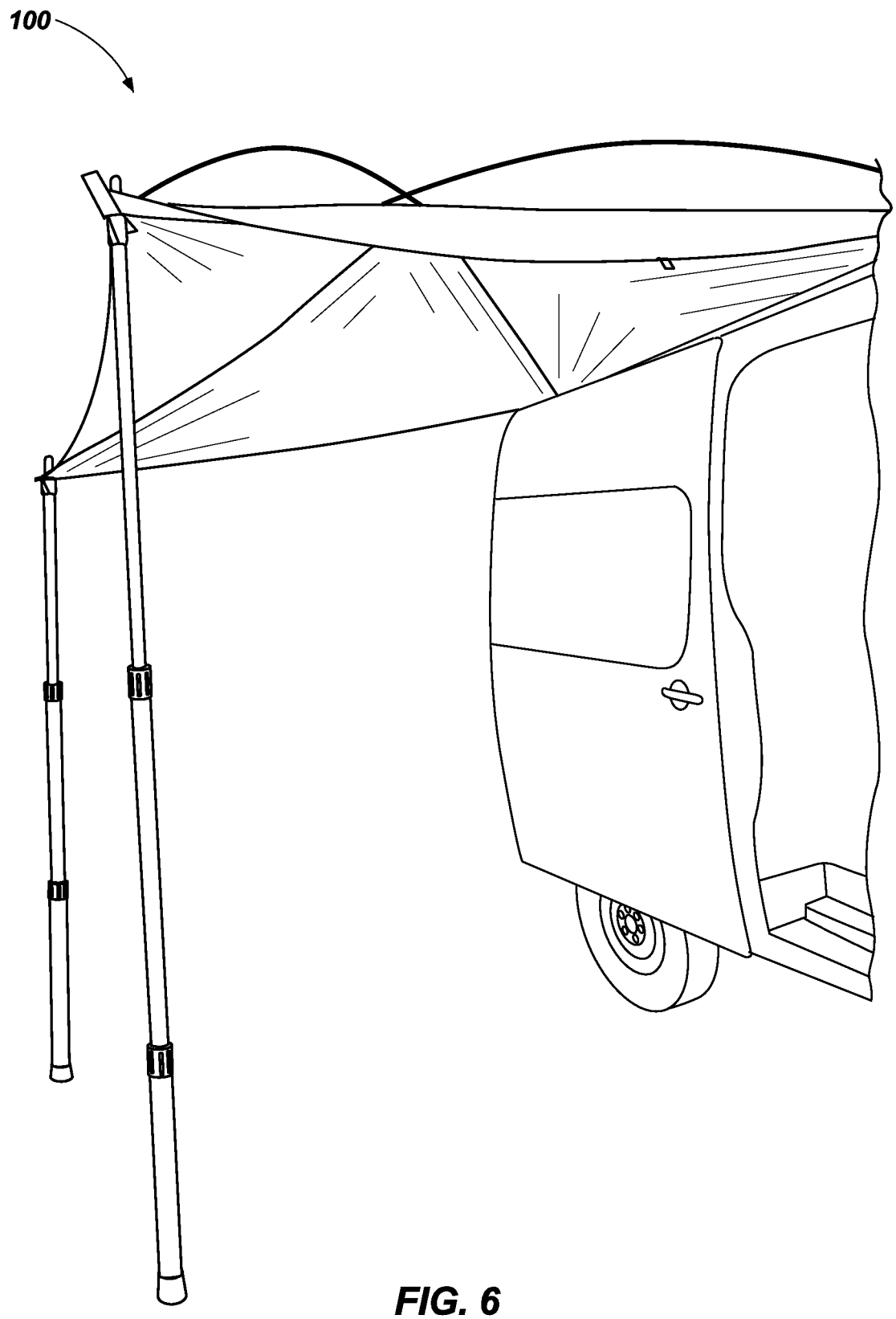
FIG. 6 illustrates a perspective view of an awning apparatus in accordance with the technologies and features of the disclosure.

FIG. 5 illustrates a perspective view of an awning 100 as illustrated in FIG. 1. FIG. 6 illustrates a perspective view of an awning 100 as illustrated in FIG. 2. The awning 100 includes a cover, a plurality of vertical support members, and at least one flexible connectors. The cover is configured to be stretched as illustrated in FIGS. 5-6 when the awning 100 is in use. The cover is configured to be stretched by the flexible connectors and supported by vertical support members.

Figure 7:
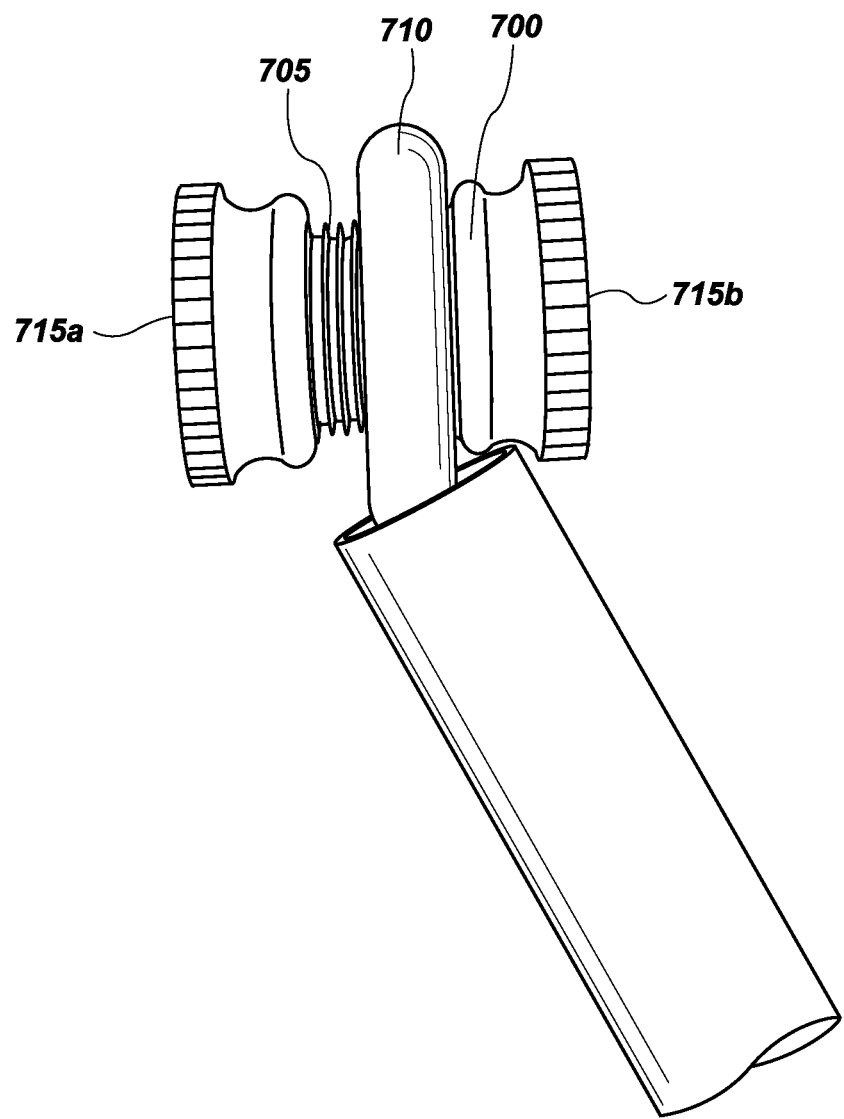
FIG. 7 illustrates a connection component for an awning apparatus in accordance with the technologies and features of the disclosure.

FIG. 7 illustrates an embodiment of a connection component 700 of an awning apparatus. The connection component may be utilized to secure a flexible connector 115 to a motor vehicle 105 or to a vertical support member 110. As shown in FIG. 7, connection component 700 may be threaded with threads 705 which may connect through a ring 710 disposed at an end of flexible connector 115. Knurled ends 715a and 715b may attach to threads 705 and may secure a grommet, for example, in the awning, to the flexible connector, in one embodiment.

Figure 8:
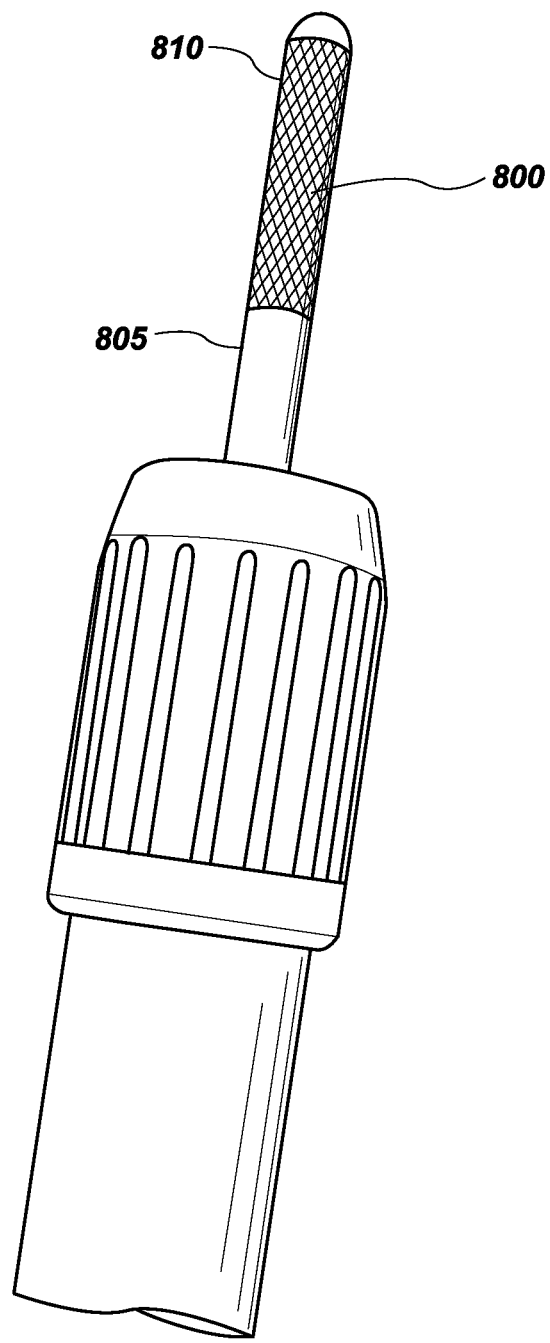
FIG. 8 illustrates a connection component for an awning apparatus in accordance with the technologies and features of the disclosure.
Figure 9:
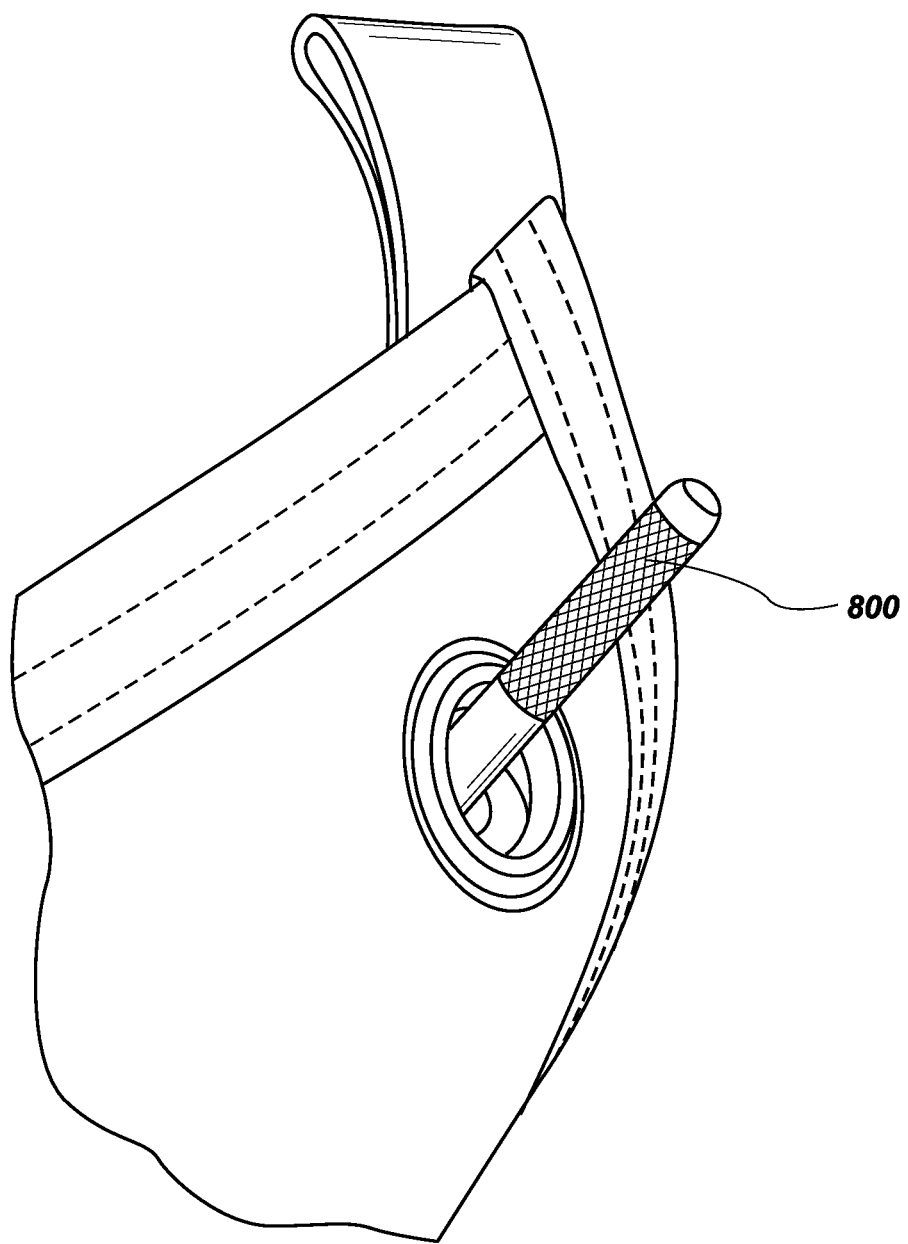
FIG. 9 illustrates a connection component for an awning apparatus in accordance with the technologies and features of the disclosure.
Figure 10:
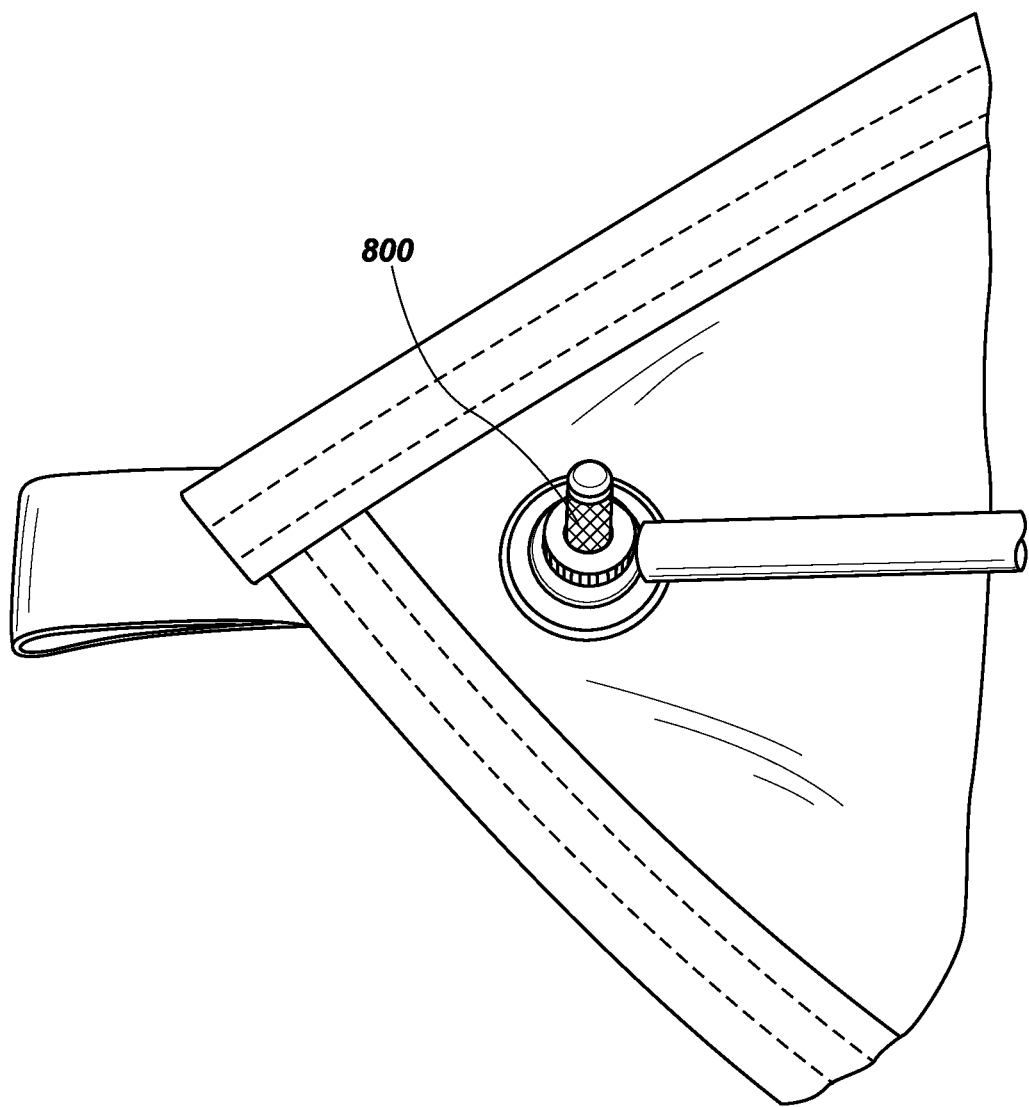
FIG. 10 illustrates a connection component for an awning apparatus in accordance with the technologies and features of the disclosure.
Figure 11:
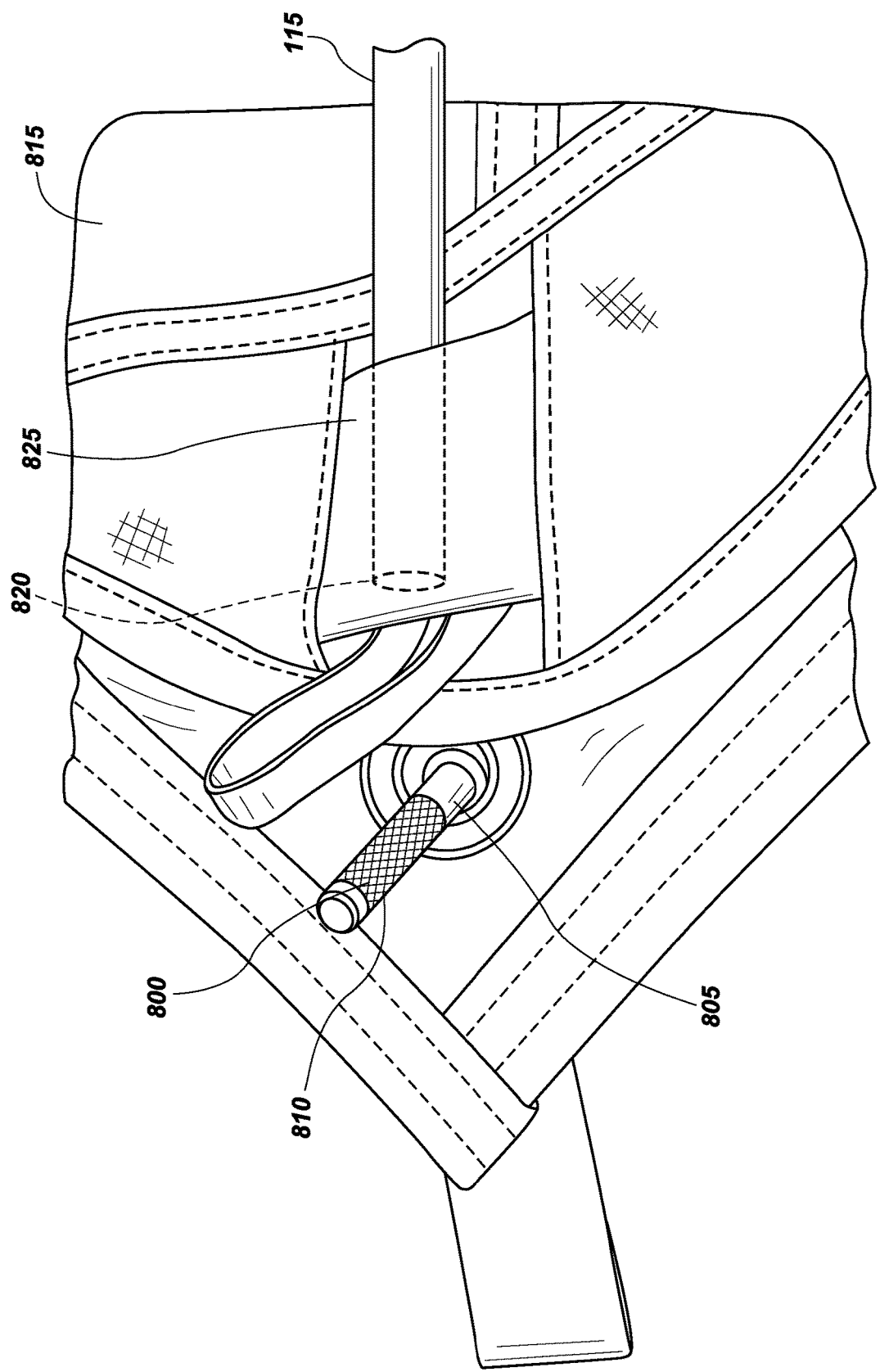
FIG. 11 illustrates a connection component for an awning apparatus in accordance with the technologies and features of the disclosure.

FIGS. 8-11 illustrate an embodiment of a connection component 800 of an awning apparatus. The connection component 800 may be utilized to secure a vertical support member 110 to the cover 120. The connection component may be utilized to secure the cover 120 to a flexible connector 115 or a motor vehicle 105. FIG. 8, for example, illustrates connection component 800 as a rod 805 with an end 810 (which may or may not be textured) having a diameter that is sufficient to pass through a grommet, for example, in the awning or attached to a corner of an awning as a ring, which is also referred to herein as a grommet. FIG. 9 illustrates rod 805 passing through a grommet 805 in an awning 815. The textured end 810 of rod 805 extends completely through grommet 805. FIG. 10 illustrates one embodiment of connecting connection component 800 to awning 815 by inserting end 810 of rod 805 through gromet 805 and attaching flexible connector 115 to end 810 by connection component 800. Connection component 800 secures awning 810 to flexible connector 115. FIG. 11 illustrates another embodiment where end 810 is disposed through grommet 805 in awning 815. However, a pocket 825 is affixed to a corner of awning 815 such that an end 820 of flexible connector 115 may be disposed within pocket 825 and thereby maintain tension in flexible connector 115. Pocket 825 may be secured to awning by stitching or by a loop 830 which secures pocket 825 to end 810 of rod 805. Pocket 825 may also be tapered such that a base of the pocket is wider than a rod entrance end of pocket 825. This has shown to set the pocket at a slightly upward angle which assists in producing appropriate tension on flexible connector 115 to provide an arch in flexible connector 115.

Figure 12:
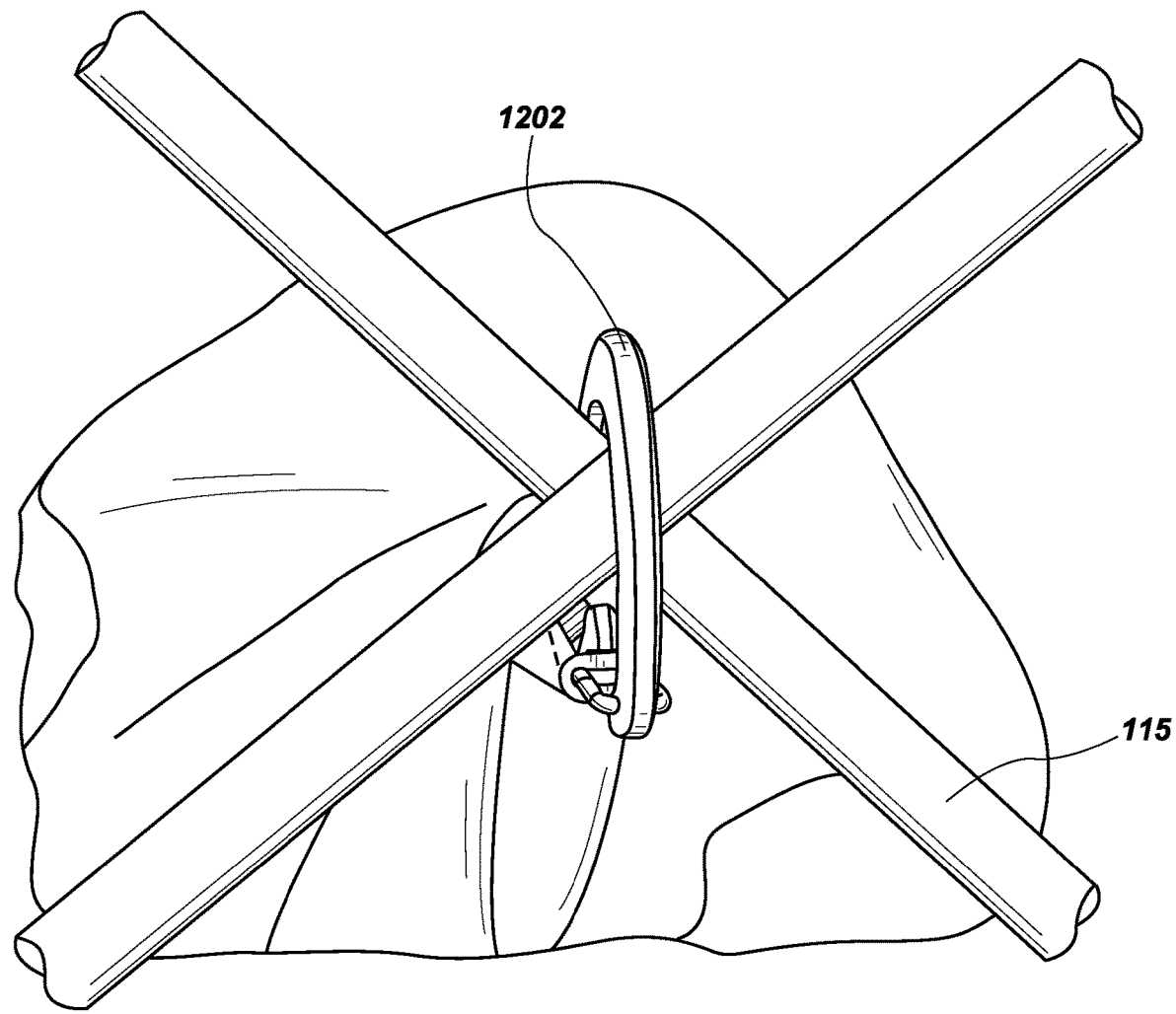
FIG. 12 illustrates flexible connectors for an awning apparatus in accordance with the technologies and features of the disclosure.
Figure 13:
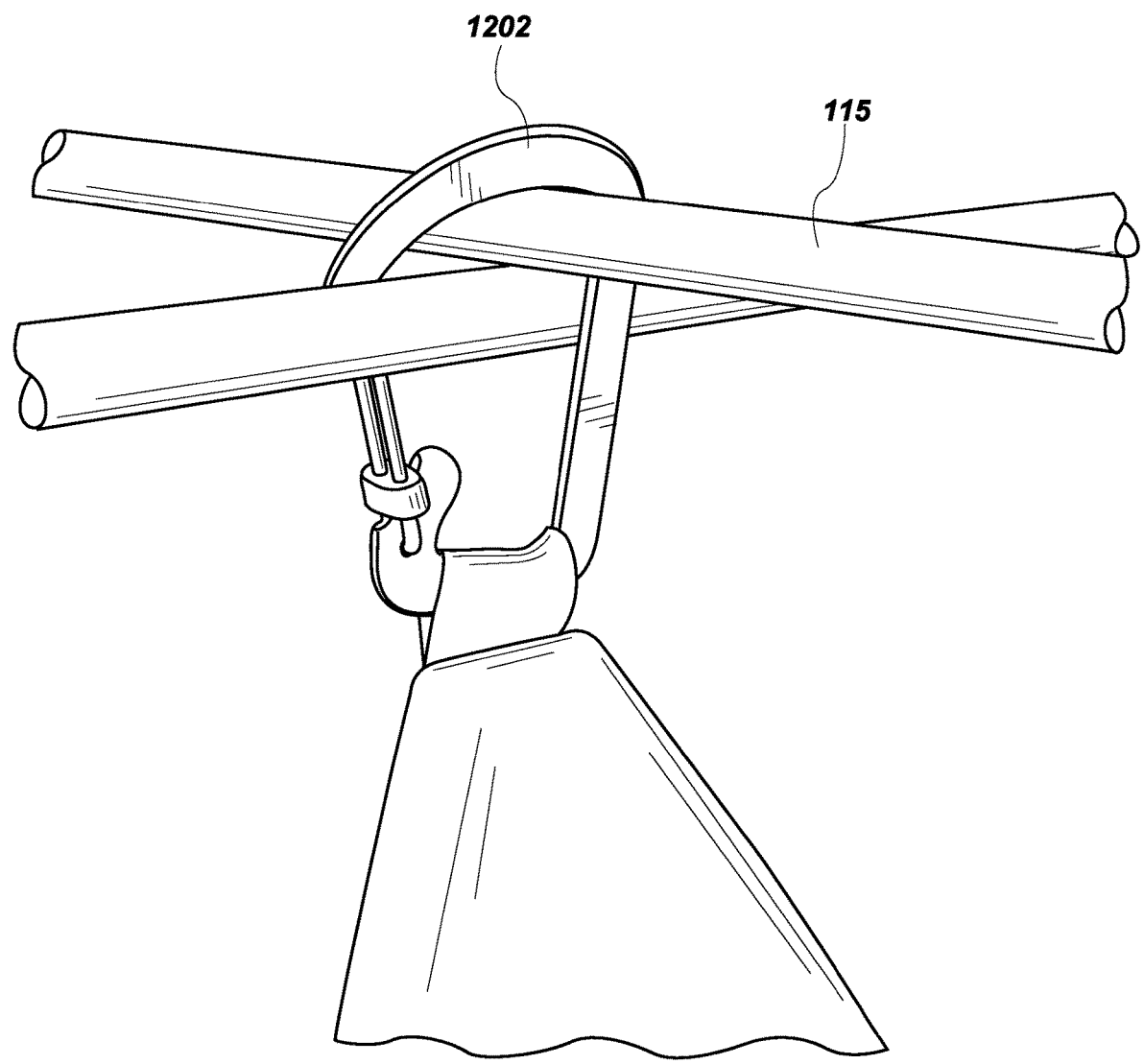
FIG. 13 illustrates flexible connectors for an awning apparatus in accordance with the technologies and features of the disclosure.
Figure 14:
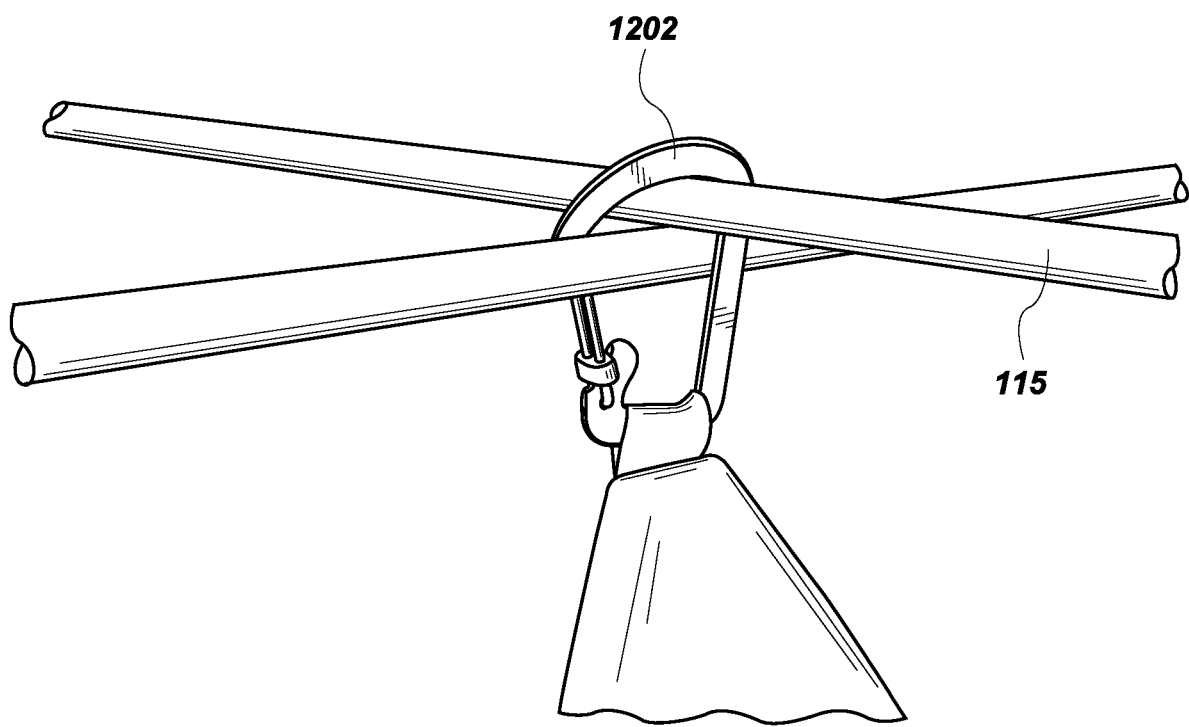
FIG. 14 illustrates flexible connectors for an awning apparatus in accordance with the technologies and features of the disclosure.

FIGS. 12-14 illustrate embodiments of flexible connectors 115 and an attachment mechanism 1202. As illustrated in FIGS. 12-14, an awning 100 may include two flexible connectors 115 configured to cross one another above the cover 120. The cover 120 may be secured to the two (or more) flexible connectors 115 via the attachment mechanism 1202. The attachment mechanism 1202 may include any suitable attachment in the art, including a clip, a tie, a cord, a flexible cord, a snap, a buckle, a carabiner, and so forth. In one embodiment, a plurality of attachment mechanisms 1202 may be disposed along a top surface of an awning, such as awning 100, shown in FIG. 1. These attachment mechanisms may connect awning 100 to flexible connectors 115 at various points along the length of flexible connectors 115. Awning 100, for example, may be sewn by loops, to attachment mechanisms 1202 which attach awning 100 to flexible connectors 115. Attachment mechanism 1202, as illustrated in FIGS. 12-14 is illustrated as a carabiner but may use any suitable attachment described above at different points along flexible connectors 115.

In an embodiment, the awning apparatus includes a support structure that is constructed of one or more flexible connectors. The support structure is located above the cover (relative to the ground) in one embodiment. The one or more flexible connectors stretch the cover and hold the cover with tension such that the cover provides a structure sufficient for providing protection against sun and other elements. The support structure comprising the one or more flexible connectors may greatly decrease the overall weight of the awning compared with various awnings known in the prior art. As such, the awning is convenient to transport and may be desirable over cumbersome and heavy awnings as known in the art. Further, the awning is particularly simple to setup and may be setup by a user in a very short amount of time compared with other awnings known in the art.

In an embodiment, the flexible connectors are configured to stretch the cover in pyramid shape or rounded pyramid shape that may be somewhat flat and stretched very taught. In an embodiment, the flexible connectors are configured to stretch the cover in a pyramid shape that may be somewhat tall and configured to permit rain and other elements to quickly drip down the side of the cover. In an embodiment, the flexible connectors are configured to stretch the cover in a mostly flat orientation. In an embodiment, a single awning may provide a variety of orientations, such that a user may choose to stretch the cover to a somewhat short period shape, a taller period shape, or a mostly flat orientation. In an embodiment this is accomplished by adding or removing the plurality of shorter rigid connections that make up the flexible connectors.

The awning may be attached to a motor vehicle such as a van, a recreational vehicle, a trailer, a truck, a sedan, and so forth. The cover of the awning may be directly attached to the motor vehicle at one or more points. In an embodiment, the cover of the awning is directly attached to the vehicle at one point, or two points, or three points, or four points, or any suitable number of points depending on the dimensions of the vehicle and/or the cover. The cover may include one or more hooks configured to secure the cover to, for example, a door of the vehicle, a roof rack of the vehicle, a frame of the vehicle, a cable attached to the vehicle, and so forth. In alternative embodiments the awning may be attached to a building, a fence, a tree, or any other rigid structure.

In an embodiment the awning is freestanding, and the awning is not attached to a structure such as a vehicle, a building, a fence, a tree, and so forth. In such an embodiment the awning may include three or more vertical support members configured to support the awning and suspend the cover above the ground. The cover may be stretched by the vertical support members and the flexible connectors.

The awning apparatus as disclosed in the present application may provide protection from rain, sun, and other weather conditions. The awning may be attached to a motor vehicle or may be freestanding and the awning may be adaptable to various terrain and weather conditions. The awning may further be adaptable to be secured to various attachment structures such as a vehicle, a building, a fence, and so forth. In an embodiment, the awning is configured to be utilized by a user engaging in an outdoor activity such as camping, picnicking, tailgating, or other recreational activities. It should be appreciated that the awning may further be utilized indoors as, for example, a vendor booth at a trade show or other event.

The cover of the awning apparatus may be connected to the flexible connectors and/or the vertical support members in any suitable fashion. In an embodiment, the cover is a rectangular shape and includes a pocket at each corner of the rectangular shape. In such an embodiment, the pocket is configured to receive the flexible connector and/or the vertical support member. In an embodiment, the cover includes a clip or other attachment mechanism at each attachment point. In an embodiment, the cover has a circular or oval shape and the cover includes pockets or other attachment mechanisms integrated near an outer edge of the cover.

EXAMPLES

The following examples pertain to further embodiments.

Example 1 is an awning apparatus. The apparatus includes a plurality of vertical support members. The apparatus includes one or more flexible connectors coupled to the plurality of vertical support members, wherein each of the one or more flexible connectors is removably secured to an upper end of at least one of the plurality of vertical support members. The apparatus includes a cover adapted for engaging the plurality of support members. The apparatus includes an attachment mechanism attached to the cover and configured to removably secure the cover to at least one of the one or more flexible connectors. The apparatus is such that the one or more flexible connectors is configured to provide tension to hold the cover in a stretched orientation.

Example 2 is an apparatus as in Example 1, further comprising a vehicle connector configured to attach the cover to an exterior side of a vehicle.

Example 3 is an apparatus as in any of Examples 1-2, wherein the cover is supported by the plurality of vertical support members such that the cover is suspended above the ground.

Example 4 is an apparatus as in any of Examples 1-3, wherein each of the one or more flexible connectors comprises a length and the cover comprises a rectangular shape having a diagonal length. The apparatus is such that the length of at least one of the one or more flexible connectors is greater than the diagonal length of the cover.

Example 5 is an apparatus as in any of Examples 1-4, wherein the length of at least one of the one or more flexible connectors is greater than the diagonal length of the cover, and wherein the at least one of other one or more flexible connectors is configured to flex to an arc formation having an arc width that extends from a first end of the flexible connectors to a second end of the flexible connector. The at least one of the one or more flexible connectors is configured to flex such that the arc width is equal to the diagonal length of the cover.

Example 6 is an apparatus as in any of Examples 1-5, wherein the one or more flexible connectors comprises a pole configured to flex to an arc shape.

Example 7 is an apparatus as in any of Examples 1-6, wherein at least one of the one or more flexible connectors comprises a plurality of rigid poles each having a hollow center, wherein each of the plurality of rigid poles is connected via a flexible cord running through each of the hollow centers.

Example 8 is an apparatus as in any of Examples 1-7, wherein at least one of the one or more flexible connectors comprises a plurality of rigid poles. Each of the plurality of rigid poles comprises a hollow center, a first end, and a second end. The first end comprises a circumference configured to receive the second end of a different rigid pole. Each of the plurality of rigid poles is configured to be removably connected in a continuous orientation to provide a single flexible connector.

Example 9 is an apparatus as in any of Examples 1-8, wherein each of the plurality of vertical support members comprises a telescoping pole.

Example 10 is an apparatus as in any of Examples 1-9, wherein the cover comprises one or more pockets configured to receive an end of at least one of the plurality of vertical support members.

Example 11 is an apparatus as in any of Examples 1-10, wherein the cover comprises one or more pockets configured to receive an end of at least one of the one or more flexible connectors, such that the at least one of the one or more flexible connectors holds the cover in a taught orientation by tension only.

Example 12 is an apparatus as in any of Examples 1-11, wherein at least one of the one or more flexible connectors is configured to be attached to an exterior side of a motor vehicle.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. An apparatus, comprising:
   a plurality of vertical support members;
   a suction mount, the suction mount further comprises a female connector receiver;
   one or more flexible connectors coupled to the plurality of vertical support members, wherein each of the one or more flexible connectors is removably secured to an upper end of at least one of the plurality of vertical support members, wherein the female connector receiver accepts one or more of the one or more flexible connectors;
   a cover engaging the plurality of vertical support members and the suction mount;
   an attachment is attached to the cover and configured to removably secure the cover to at least one of the one or more flexible connectors;
   wherein the one or more flexible connectors is configured to provide tension to hold the cover in a stretched orientation;
   a grommet positioned near an outside edge of the cover, the grommet being sized to connect the cover to one or more of the plurality of vertical support members; and
   a pocket positioned on the cover near the grommet, wherein a base of the pocket ends before the gromet such that the grommet is positioned between the base of the pocket and the outside edge of the cover;
   wherein an opening of the pocket is sized to receive the one or more flexible connectors, wherein the pocket is tapered from the opening to the base; and
   wherein a loop is attached to the cover beneath the pocket and a loop end extends towards the gromet.

2. The apparatus of claim 1, wherein the attachment is a carabiner.

3. The apparatus of claim 2, wherein the carabiner is attached to the cover at a point where two of the one or more flexible connectors cross.

4. The apparatus of claim 1, wherein the attachment is a clip.

5. The apparatus of claim 4, wherein the attachment is one of a plurality of attachments attached to the cover and wherein one or more of the plurality of attachments is a clip.

6. The apparatus of claim 4, wherein the clip is attached to the cover by the loop, and the loop is sewn to the cover.

7. The apparatus of claim 1, wherein each of the one or more flexible connectors comprises a length and the cover comprises an orthogonal shape having a diagonal length and wherein the length of the flexible connectors is greater than the diagonal length of the cover.

8. The apparatus of claim 7, wherein the one or more flexible connectors are flexed into an arc when installed in the cover.

9. The apparatus of claim 1, wherein the pocket receives the one or more flexible connectors.

10. The apparatus of claim 1, wherein the pocket is tapered such that the base of the pocket has a narrower width than a flexible connector receiving end of the pocket.

11. The apparatus of claim 1, wherein the grommet is one of a plurality of grommets installed in the cover.

12. The apparatus of claim 11, wherein a grommet of the plurality of grommets is located near the corner of the cover.

13. The apparatus of claim 12, wherein each of the plurality of vertical support members comprises a telescoping pole.

14. The apparatus of claim 13, wherein each of the plurality of vertical support members connect to the cover by one of the plurality of grommets corresponding to the plurality of vertical support members.

15. The apparatus of claim 1, wherein the one or more flexible connectors comprises one or more pieces which may be assembled together to form the one or more flexible connectors.

* * * * *